United States Patent [19]

Kaiser et al.

[11] 3,885,304

[45] May 27, 1975

[54] ELECTRIC CIRCUIT ARRANGEMENT AND METHOD OF MAKING THE SAME

[75] Inventors: Anton Kaiser; Helmut Keller, both of Reutlingen; Adolf Kugelmann, Leonberg, all of Germany

[73] Assignee: Robert Bosch G.m.b.H., Stuttgart, Germany

[22] Filed: Dec. 27, 1973

[21] Appl. No.: 428,910

Related U.S. Application Data

[62] Division of Ser. No. 337,742, March 2, 1973.

[30] Foreign Application Priority Data

Mar. 23, 1972 Germany ............................ 2214163
May 31, 1972 Germany ............................ 2226395

[52] U.S. Cl. ........................ 29/627; 29/588; 29/589; 29/626; 174/52 PE; 174/68 S; 357/72; 357/80

[51] Int. Cl. ................................................ H05k 3/28

[58] Field of Search...... 29/626, 627, 577, 588–591, 29/488, 577; 174/68 S, 52 PE; 317/101 R, 101 A, 101 C, 101 CC; 264/135, 272

[56] References Cited

UNITED STATES PATENTS

| | | | |
|---|---|---|---|
| 2,777,193 | 1/1957 | Albright et al. | 317/101 C X |
| 2,967,979 | 1/1961 | Plesser et al. | 317/101 CC |
| 3,179,854 | 4/1965 | Luedicke et al. | 174/68 S X |
| 3,283,060 | 11/1966 | Wiese | 174/68 S |
| 3,339,117 | 8/1967 | Fisher | 174/68 S X |
| 3,381,081 | 4/1968 | Schalliol | 174/68 S |
| 3,469,148 | 9/1969 | Luno | 29/627 X |
| 3,558,993 | 1/1971 | Rigby | 174/68 S X |
| 3,628,039 | 12/1971 | Ochs et al. | 317/101 C X |

*Primary Examiner*—C. W. Lanham
*Assistant Examiner*—Joseph A. Walkowski
*Attorney, Agent, or Firm*—Michael S. Striker

[57] ABSTRACT

A circuit board of electrically insulating material is provided with a printed circuit including one or more circuit strips. A discrete electrical component, or several of them, is mounted on the circuit board in circuit with the circuit arrangement and at least one semiconductor unit is provided on the circuit board and electrically connected with the circuit thereof.

10 Claims, 9 Drawing Figures

ELECTRIC CIRCUIT ARRANGEMENT AND METHOD OF MAKING THE SAME

This is a division of application Ser. No. 337,742 filed Mar. 2, 1973.

BACKGROUND OF THE INVENTION

The present invention relates to electric circuit arrangements, and more particularly to electric circuit arrangements having at least one semi-conductor unit. It also relates to a method of making such circuit arrangements.

It is well known by now that electrical circuit arrangements may have semi-conductor units which accommodate a single semi-conductor or, using monolithic integrated circuitry, having two or more semi-conductor elements. In either case, however, the prior art has always provided the semi-conductor units as well as the other electrical components associated with the circuit arrangement with separate housings, through which the connecting terminals extend to the exterior. The terminals themselves are then connected directly with the circuits of the printed circuit board on which the arrangement is provided, or indirectly via appropriate sockets.

Operationally these arrangements are fully suitable for use, but they are necessairly expensive to produce and therefore expensive to sell. A major reason for this is the fact that it was heretofore always though necessary in the art to provide a special housing, especially for the semi-conductor unit or units, in order to protect the unit and in order to be able to use the housing as a heat sink. Evidently, the provision of such housings and the manner in which the semi-conductor units had to be mounted in the housings, whereupon the housings then had to be mounted on the circuit board, is a major contributing factor in the high expense of such arrangements according to the prior art.

SUMMARY OF THE INVENTION

It is, accordingly, a general object of the present invention to overcome the disadvantages of the prior art.

More particularly, it is an object of the present invention to provide an electric circuit arrangement which, according to the present invention, does not require housings for the semi-conductor unit or units and discrete electrical components which are also associated with the circuit arrangement.

Another object of the invention is to provide a method of making such a novel circuit arrangement.

In keeping with these objects, and with others which will become apparent hereafter, one feature of the invention resides in an electrical circuit arrangement, in a combination, comprising a circuit board of electrically insulating material, and circuit means on the circuit board. The circuit means includes at least one circuit strip. At least one discrete electrical component is mounted on the circuit board in circuit with the circuit means. At least one semi-conductor unit is provided on the circuit board, and connecting means connects the semi-conductor unit with the circuit board.

By having the semi-conductor unit mounted directly on the circuit board, the necessity for a supporting housing is avoided. Moreover, it has been found that it is possible to protect the semi-conductor unit without a separate housing, if mounted in this manner, and that it is not necessary for a housing to be present and to act as a heat sink if the arrangement is in accordance with the present invention.

The semi-conductor unit has, in accordance with conventional practice, a plurality of terminals provided on its upper or exposed side, and these can be connected with the respectively associated circuit strips of the circuit means via so-called bond wires or via beam-lead connections. Bond wires and beam-lead connections are well known in this art and require no detailed discussion. It should, however, be pointed out that where ever the term "circuit strip" is used herein and in the appended claims with reference to the circuit means provided on the circuit board, it is not intended that such terminology should be limited to a particular strip-shaped configuration. In the printed circuit board art the term strip has become established for any kind of configuration of a portion of the circuit, so that it could be strip-shaped, it could be square, rectangular or have any other configuration. Also, the term "printed circuit" or "printed circuit board" as it may be used herein evidently is concerned with the generic type of circuit arrangement which is so designated in the art, not merely with a circuit arrangement in which the circuits are applied exclusively by printing onto the board.

By resorting to the present invention it is possible to produce an electric circuit arrangement whose manufacturing costs are considerably lower than those known from the prior art, and which at the same time is at least the equal in all respects of the circuit arrangements known from the prior art.

In the region where the semi-conductor unit or units will be provided, and of the electrical terminals thereof, the arrangement may be provided with a covering for protective purposes. The circuit board itself is advantageously of synthetic plastic material, for instance of glass fiber reinforced epoxy resin or of so-called hard paper. The circuit strips of the printed circuit are advantageously of copper and have a thickness which is greater than 20 micron. The manner in which the circuit strips can be produced is known from the art, that is the circuit board may be copper plated and subsequently masks may be employed for the removal by etching of those portions of the copper plating which are not necessary, leaving behind the printed circuit. However, other ways of producing the printed circuit are also known and can be employed.

To facilitate removal of the heat generated by the semi-conductor unit in operation, that is to act as a heat sink, the circuit strip on which the semi-conductor is mounted may be of a area which is larger or much larger by comparison with the other circuit strips of the circuit. Evidently, heat will then be transmitted into the circuit strip and will be radiated from the same over the surface area thereof. In place of this, or in addition thereto, the circuit strip carrying the semi-conductor unit may also be provided with a layer of solder. If it is necessary to further improve the removal of heat, than the circuit board itself may be provided in its interior with an insert having good thermally conductive properties, for instance a metal mesh or the like. Still another manner of improving the removal of heat from the semi-conductor unit is to provide the circuit strip carrying the semi-conductor unit with at least one additional heat sink which is in thermally transmissive contact with it.

According to a further concept of the invention it is advantageous if the semi-conductor unit is mounted in the marginal region of a large-area circuit strip constituting a portion of the circuit, and to have other circuit strips extend from laterally to the region of this marginal portion, with the leads connecting the semi-conductor unit terminals with these other or additional circuit strips.

However, it is also possible to provide the circuit strip carrying the semi-conductor unit with a projection extending from one edge of the circuit strip, and to have the semi-conductor unit be located on this projection. In that case the additional circuit strips with which the terminals of the semi-conductor unit are to be electrically connected can extend on the circuit board from three sides to the vicinity of this projection.

Another possibility is to have the circuit strip carrying the semi-conductor unit subdivided into two large-area main portions which are connected by a narrow neck-like portion on which latter the semi-conductor unit itself is mounted. The additional circuit strips to which the terminals of the semi-conductor unit are to be electrically connected, can than extend to this neck from opposite sides on the circuit board.

It has been further found to be particularly advantageous if the single or several discrete electrical components which are part of the electric circuit arrangement in addition to the single or several semi-conductor units, to be provided on one of the major surfaces of the circuit board, and to have the associated circuit strips with which the electrical components are to be connected provided on the opposite major surface of the circuit board. The circuit board in such a case will be provided with holes through which conductors or leads of the electrical components are passed and solder-connected at the other major surface with the respective circuit strips. The semi-conductor unit may be located at the major surface of the circuit board which is opposite that at which the electrical components are located, or it may be located on the same surface. If the semi-conductor unit is located at the opposite major surface than all of the circuit strips of the circuit means may be provided on this same surface, but on the other hand it is also possible to have some of these circuit strips located on one and others on the other major surface. In that case the semi-conductor unit would be located on that major surface at which the electrical components are also provided.

As already indicated, the invention is also concerned with a method for making the novel electric circuit arrangement. In keeping with the concept of the invention, this method involves the provision on the circuit board of the circuit means, and of holes extending through the circuit board. The semi-conductor unit will be provided at one surface of the circuit board and its terminals will be connected electrically to respective circuit strips. Thereupon the semi-conductor unit and its electrical terminals will be provided with a protective covering and then the discrete electrical component or components will be placed at the opposite major surface of the circuit board and there leads will be extended through respective one of the holes to be connected at that side at which the semi-conductor unit is located, with respective ones of the circuit strips of the circuit means, advantageously by passing the entire arrangement over a solder bath.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
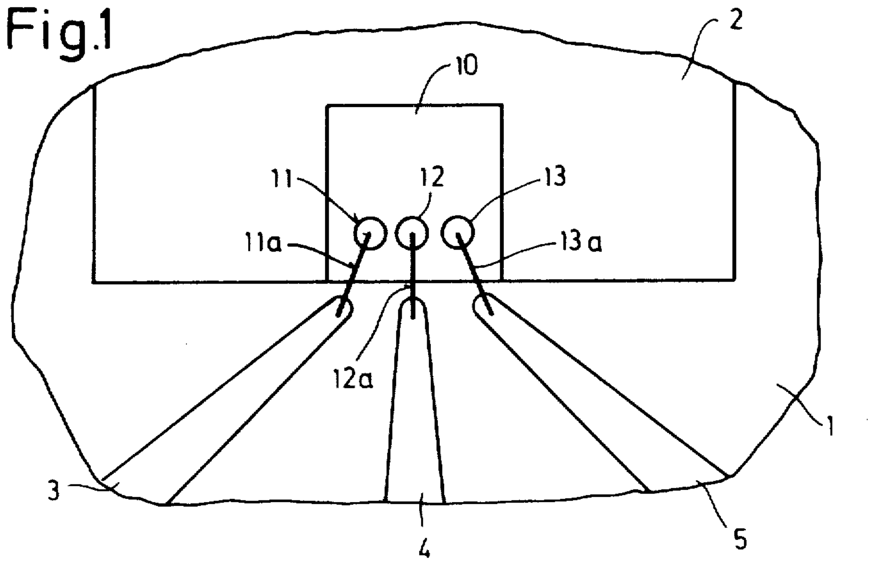
FIG. 1 is diagrammatic fragmentary top-plan view illustrating a first embodiment of an electric circuit arrangement according to the invention.

Discussing the drawing in detail, and referring firstly to the embodiment illustrated in FIG. 1, it will be seen that the electric circuit arrangement which is shown in that FIGURE uses a circuit board 1 which is of an electrically insulating material, for instance synthetic plastic material or the like as previously discussed. The circuit board 1 is provided with electrical circuit strips 2, 3, 4 and 5 which together from a so-called printed circuit. The circuit board 1 is further the carrier of active and/or passive and/or electro-mechanical components, that is discrete electrical components which are connected in known manner to the respective circuit strips. Such components are shown in FIG. 4 and other FIGURES, but have been omitted in FIGS. 1–3 for the sake of clarity.

The circuit strip 2, which need of course not be strip-shaped, as has been previously pointed out, has bonded to its surface a semi-conductor unit 10 which in the illustrated embodiment contains a monolithically integrated circuit. Such monolithically integrated circuits using a plurality of semi-conductor units are already well known and require no detailed discussion. Of course, the semi-conductor unit 10 could also be in form of a single semi-conductor element.

In the embodiment of FIG. 1, the underside of the semi-conductor unit 10, that is the one facing the circuit strip 2, is not metallized but constitutes an electrode which is electrically conductively connected with the circuit strip 2 by means of an electrically conductive adhesive or bonding agent. Such bonding agents are well known in this field. However, it will be clear that the semi-conductor unit 10 could also be soldered to the circuit strip 2 in which case the underside of the semi-conductor unit 10 would, however, have to be metallized. Alternately, the underside of the unit 10 need not be configurated as an electrode in which case the unit 10 can be bonded to a circuit strip which does not carry an electrical current, or if it is metallized it can be soldered to such a circuit strip. On the other hand, it is possible of course to bond the unit 10 with an electrically non-conductive bonding agent to a circuit strip which is current-carrying.

The upper side of the unit 10 is provided with three further electrodes which, contrary to the under side of the unit 10, are provided with metallic terminals 11, 12 and 13. In this embodiment, these terminals are connected via bond wires 11*a*, 12*a* and 13*a* with the additional circuit strips 3, 4 and 5, respectively. The bond wires 11*a*, 12*a*, 13*a* and the associated bonding points at the terminals 11, 12 and 13 of the semi-conductor unit 10 on the one hand, and at the ends of the circuit strips 3, 4 and 5 on the other hand, are hereafter also designated for short as the "electrical contacts" of the semi-conductor unit. It should be pointed out that in place of the bond wires it is also possible to use so-called beam-lead connections, which are for instance described in "Electronic Devices and Circuits", Millman and Shalkias, published by McGraw-Hill, pages 446–449.

In any case, the circuit strip 2 serves as a heat sink for heat which develops during operation of the semi-conductor unit. Because of this the surface area of the circuit strip 2 must be rather large to permit adequate radiation of heat therefrom. On the other hand, the distance of the semi-conductor unit 10 to the circuit strips 3, 4 and 5 must not be too large because this would make it difficult to affix the bond wires 11*a*, 12*a* and 13*a*. This problem is overcome in the embodiment of FIG. 1 by having the semi-conductor unit 10 be located at a margin of the strip 2 and by having the strips 3, 4 and 5 extend from one lateral side towards the margin and the unit 10 as shown.

Figure 2:
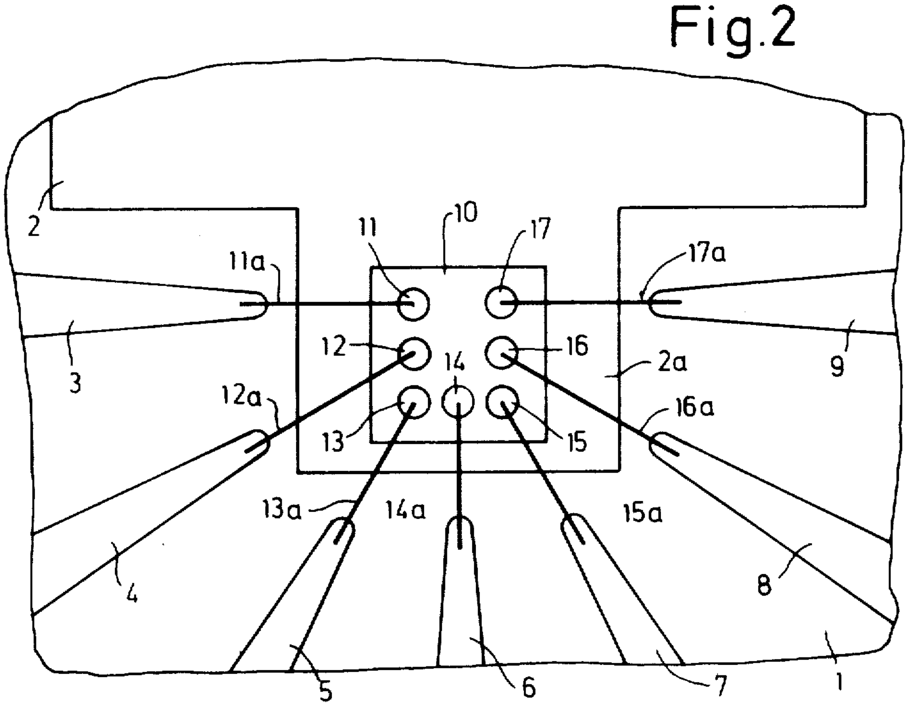
FIG. 2 is a view similar to FIG. 1 but illustrating a second embodiment.

The embodiment in FIG. 2 also utilizes a circuit board 1. This circuit board is not flexible and may in known manner be of phenol or cure resin or another synthetic plastic resin. The board 1 is provided with electrical circuit strips 2, 3, 4, 5, 6, 7, 8 and 9. These circuit strips are connected with discrete electrical components which are not shown in FIG. 2, and the strip 2 is further provided with a semi-conductor unit 10 which also is in form of a monolithically integrated circuit. The unit 10 may be connected with the strip 2 electrically conductively or electrically non-conductively, depending upon whether the under side of the unit 10 is constructed as an electrode or not.

The upper side of the unit 10 is provided with metallic contacts 11, 12, 13, 14, 15, 16 and 17, and these in turn are connected via bond wires 11*a*, 12*a*, 13*a*, 14*a*, 15*a*, 16*a* and 17*a* with the circuit strips 3, 4, 5, 6, 7, 8 and 9. In this embodiment, as in FIG. 1, the bond wires can be replaced by beam-lead connectors. To facilitate the affixing of the bond wires the semi-conductor unit 10 is provided on a laterally extending projecting portion of the circuit strip 2, this portion being designated with reference numeral 2*a*, and the strips 3–9 extend from three lateral sides closely to this portion 2*a*.

Figure 3:
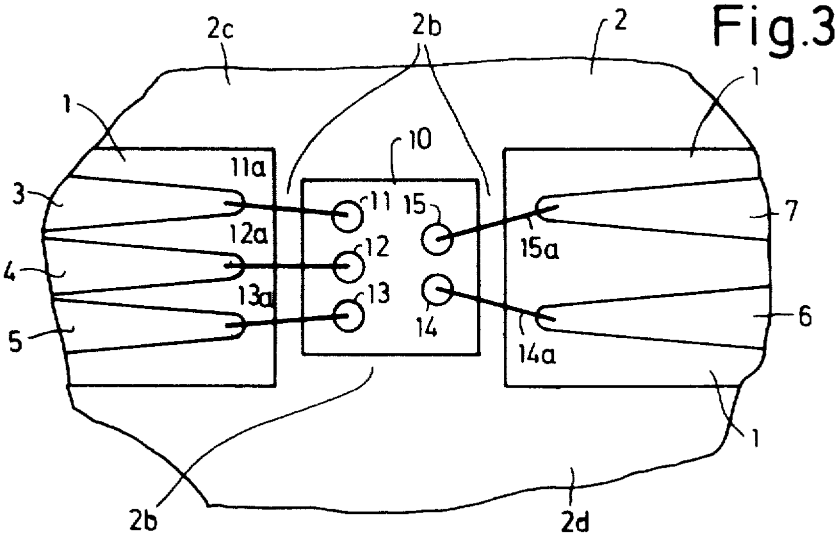
FIG. 3 is a view similar to FIG. 2 but illustrating a third embodiment.
Figure 4:
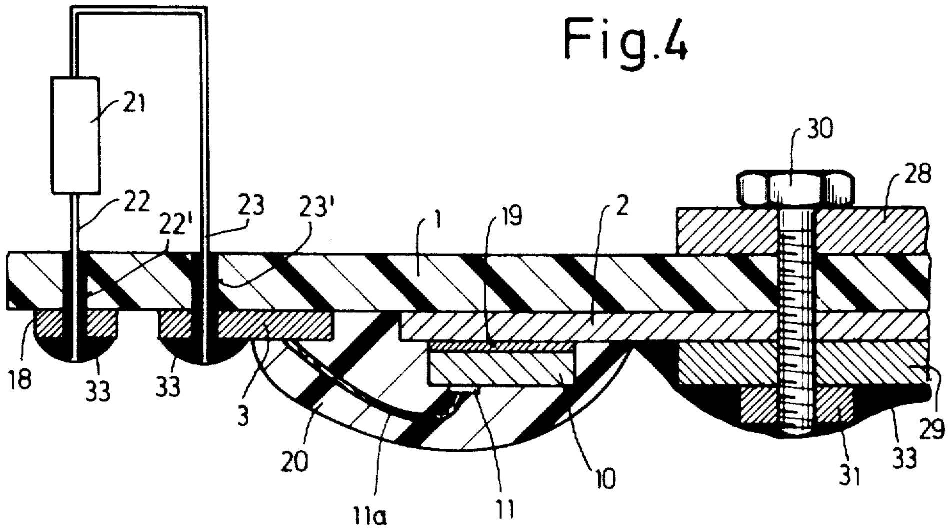
FIG. 4 is a fragmentary cross section on an enlarged scale, through a fourth embodiment of the invention.

FIG. 3 shows a further embodiment in the invention whereagain a circuit board 1 is provided, having a large-area circuit strip 2. In this embodiment the circuit strip 2 is actually composed of two main portions 2*c* and 2*d* which are connected by a narrow bridge portion 2*b* on which the semi-conductor unit 10 is provided. The circuit strips 3, 4, 5, 6 and 7 are provided on the circuit board 1 and extend from two sides laterally to the vicinity of the portion 2*b*. They are connected via bond wires 11*a*–15*a* with the metallic terminals 11–15 at the upper side of the semi-conductor unit 10, as illustrated.

Reference to FIG. 4 will show how a circuit arrangement according to the invention may appear in cross section. The circuit board is designated with reference numeral 1 and it will be seen that in this instance it is provided with circuit strips 2, 3 and 18 which are provided on what is normally the under side of the circuit board 1. The semi-conductor unit 10 is bonded to the circuit strip 2, electrically conductively or else non-conductively, and the layer of bonding material used for this purpose is designated with reference numeral 19. The side of the unit 10 which faces away from the circuit strip 2 is provided with a metallic contact or terminal 11 which is electrically conductively connected with the circuit strip 3 via a bond wire 11*a*. Of course, additional terminals and associated bond wires may be provided.

The semi-conductor unit 10 and its electrical contacts is protected by a protective covering 20 which may be provided by a lacquering process, by dripping it on or by applying it in a surge-deposition method, after the bond wire 11*a* is secured. The covering 20 may be of synthetic resin, of silicone rubber or other suitable material.

The upper side of the circuit board 1 is provided with a plurality of discrete electrical components. FIG. 4 shows only one of these by way of example, namely a resistor 21 which has electrical leads 22 and 23. The resistor is connected via the lead 22 with the circuit strip 18, and via the lead 23 with the circuit strip 3 in electrically conductive relationship. To make this possible the circuit board 1 is provided in the region of the circuit strips 18 and 3 with respective holes 22' and 23' which extend also through the circuit strips 18 and 3 and through which the leads 22 and 23 are passed to be subsequently soldered to the strips 18 and 3 by a surge-deposition soldering method. The liquid solder which is applied from below by this surge-deposition method wets and contacts any of those portions of the circuit strips 18 and 3 which are not provided with a covering 20.

In addition the embodiment of FIG. 4 is provided with two heat sinks 28 and 29 which are diagrammatically illustrated and which are connected with the circuit strip 2 with the aid of screw 30 and a nut 31 in good thermally conductive relationship. These heat sinks serve to aid the heat radiation of the circuit strip 2 for removing heat from the semi-conductor unit 10. It will be appreciated that the heat sinks 28 and 29 may but need not be housings of discrete electrical components if so desired. When the liquid solder is provided to contact the under side of the circuit arrangement shown in FIG. 4, all metallic components at the under side are contacted and wetted with the solder so that solder layers 33 will form.

Figure 5:
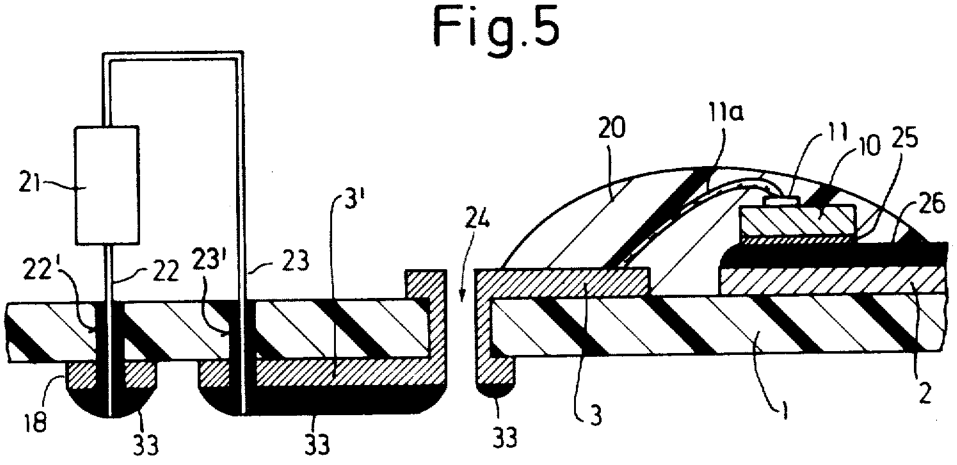
FIG. 5 is a view similar to FIG. 4 but illustrating a further embodiment of the invention.

A further embodiment, somewhat different from that of FIG. 4, is illustrated in FIG. 5 where the semi-conductor unit 10 is provided not at the under side of the circuit board 1 but on the upper side thereof together with the resistor 21. To make this possible the circuit strips 2 and 3 are also located at the upper side of the circuit board 1, whereas the circuit strip 18 is provided on the under side thereof. The circuit strip 3 has an extension 3' at the under side of the circuit board 1, and the extension 3' is connected with the strip 3 via a so-called land 24. Here also the semi-conductor unit 10 and its terminals are provided with a protective covering 20 which, contrary to the embodiment of FIG. 4, is not required at the time the leads 22 and 23 of the resistor 21 are fixed, because at that time it is not necessary to protect the semi-conductor unit 10 by means of the covering 20, due to the fact that the unit 10 is located at the upper side of the board 1. Hence the covering 20 need be provided only for protecting the unit 10 and its terminals during the later use and operation of the circuit arrangement and can therefore be applied subsequently. It is also to be noted that contrary to FIG. 4 the unit 10 is not adhered to the strip 2, but is soldered to it for which reason it is provided on its under side facing the strip 2 with a metallized layer 25. The solder layer 26 covers the entire upper surface of the strip 2 and not only serves for soldering purposes but also to improve the removal of heat from the semi-conductor unit, that is to improve the radiation of heat from the circuit strip 2 into which the heat has entered from the unit 10.

Figure 5A:
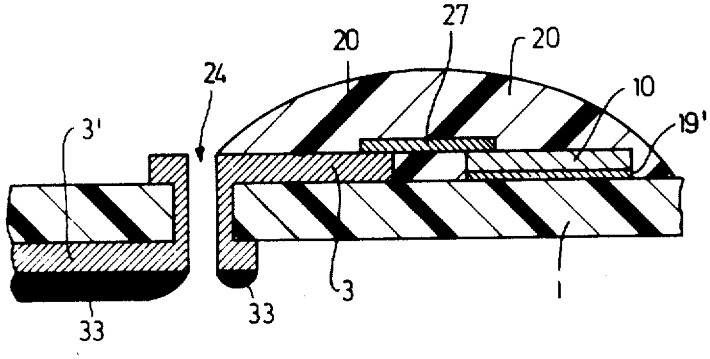
FIG. 5*a* is a view similar to FIG. 5 but illustrating a sixth embodiment of the invention.

In the embodiment of FIG. 5*a* the components shown in FIG. 5 at the left-hand side thereof and designated with reference numerals 18, 21, 22 and 23 are also to be understood as being present; for this reason they have not been separately illustrated. Unlike FIG. 5, however, the embodiment of FIG. 5*a* has the semi-conductor unit 10 directly adhered by means of an adhesive layer 19' to the circuit board 1; thus, an electrically conductive connection of the under side of the unit 10 with any of the circuit strips is impossible in this embodiment. The bonding wire 11*a* of FIG. 5 is replaced in FIG. 5*a* by a beam-lead connector 27. As in FIG. 5, the unit 10 and the beam-lead connector 27 replacing the bonding wire 11*a* are protected by a covering 20 against external influences and damage therefrom.

Figure 6:
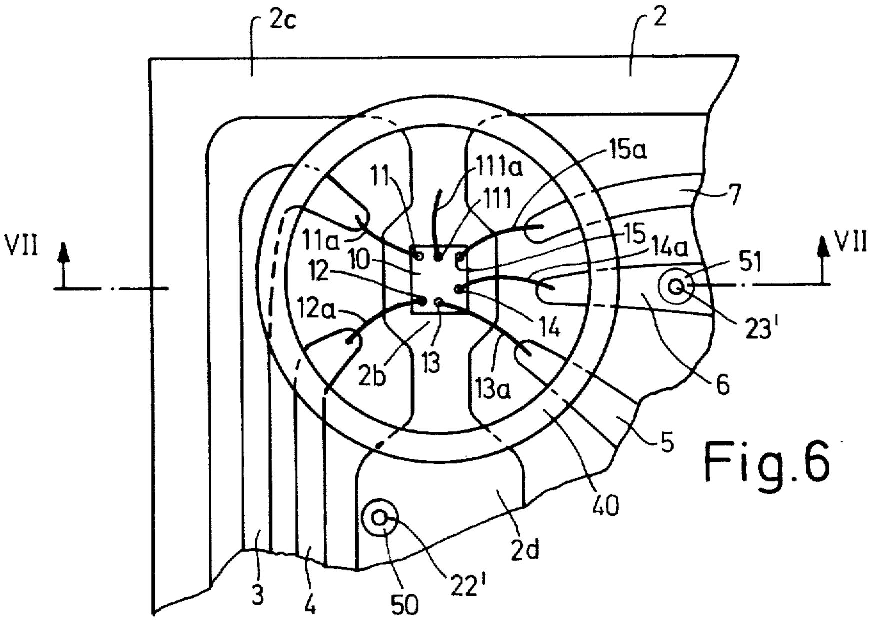
FIG. 6 is a view similar to FIG. 1 but illustrating a seventh embodiment of the invention.
Figure 7:
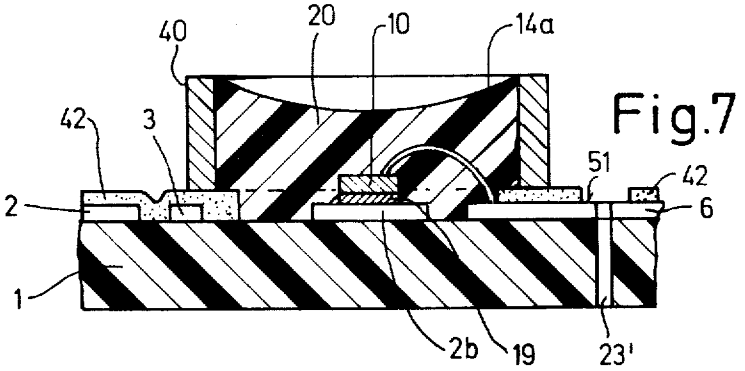
FIG. 7 is a section taken line VII—VII of FIG. 6.

FIGS. 6 and 7 illustrate a further embodiment in which the circuit board is again designated with reference numeral 1, being provided with electrical circuit strips 2–7. The strip 2 is of larger surface area than the other strips and has bonded to it by means of a bonding layer 19 the semi-conductor unit 10. In this embodiment the strip 2 is composed of two major portions 2*c* and 2*d* which are connected by a narrow neck-like connecting portion 2*b* on which the unit 10 is secured. The upper side of the unit 10 is provided with metallic terminals 111, 11, 12, 13, 14 and 15. These are connected with the circuit strips 2–7 via bond wires 111*a*, 11*a*, 12*a*, 13*a*, 14*a* and 15*a* respectively. The bond wires and the associated bonding points at the terminals of the unit 10 on the one hand, and at the ends of the strips 2–7 on the other hand, are hereafter also designated as the electrical contacts of the unit 10.

The circuit board 1 is provided with circuit holes 22' and 23' in the region of the strips 2 and 6, and these holes extend not only through the board 1 but also through the strips 2 and 6, respectively. As in the embodiments of FIGS. 4 and 5 these holes 22' and 23' serve to pass therethrough the leads of discrete electrical components, for instance the leads 22 and 23 of the resistor 21 shown in FIGS. 4 and 5 which has been omitted in FIGS. 6 and 7 for clarity. The soldering is again effected in known manner, for instance by means of the surge-deposition method.

The covering 20 is provided in this embodiment also, covering the unit 10 and its electrical contacts. It may be of synthetic plastic resin, of silicone rubber or of other suitable material and in order to prevent it from running off before it has had a chance to harden, an annulus 40 may be provided which is placed about the semi-conductor unit 10 and its electrical contacts before the material which is to form the covering 20 is placed on top of them.

It is desirable that the liquid solder which is applied by surge-deposition contact only those portions of the circuit strips which are required for soldering the electrical leads of the discrete electrical components, for instance the leads 22 and 23. To assure this the circuit board 1 having the strips 2–7 is provided with a protective layer 42 of solderstop lacquer which in the region of the circuit holes 22' and 23' leaves circular areas 50 and 51 free which serve as soldering eyes; the layer 42 is applied before the semi-conductor unit 10 is affixed to the circuit board. In addition to the areas 50 and 51 the layer 42 leaves free a larger area, which may for instance be circular, surrounding the point at which subsequently the semi-conductor unit 10 and its electrical terminals are to be affixed. The diameter of this circular area may be smaller than the internal diameter of the annulus 40 so that this ring will circumferentially contact the protective layer 42. The ring 40 may be of insulating material or of metallic material, or it may be represented by a combination of metallic and insulating material, for instance anodized aluminum.

Figure 8:
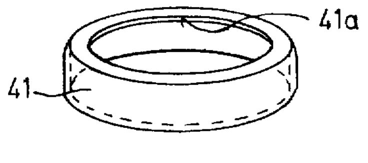
FIG. 8 is a perspective view of a detail of a component which is used in the embodiment of FIGS. 6 and 7.

FIG. 8 shows that ring 40 could be replaced by a cap 41 which is provided at the side facing away from the semi-conductor unit 10 with an opening 41*a* through which the liquid material which is subsequently during hardening to from the protective 20, can be poured. Of course, the opening 41*a* must be large enough to permit this.

The ring 40 or the cap 41 may also be brought into heat exchange contact with a heat sink, for instance via the large-area circuit strip 2 to which in turn the heat sinks 28, 29 in FIG. 4 may be affixed.

The annular elements 40 and 41 of course make it possible, especially if materials of low viscosity are used for making the covering 20, to obtain relatively high thickness for the layer of protective covering. Moreover, the elements 40 and 41 can be so configurated that they provide an additional mechanical protection for the semi-conductor unit 10, protecting the same against contact. This is particularly advantageous if the covering 20 never really becomes hard, but remains relatively soft. Such a protection is further enhanced by the development of a meniscus, which forms in the case of wetting material for the covering 20, if the elements 40 and 41 are only partially filled and, being recessed as shown, provides a further protection against inadvertent contact.

When the discrete electrical components are to be solder-connected to the associated circuit strips by means of the surge-deposition method, the annular arrangements 40 and 41, particularly in connection with the formation of the aforementioned meniscus at the upper side of the covering 20, constitutes an effective means for increasing the thermal time constant from solder surge-bath to the semi-conductor unit 10.

The thermal time constant from the solder surge-bath to the semi-conductor unit 10 is further improved by the protective layer 42 which, in addition, serves to prevent oxidation or corrosion during the manufacture and enhances the shelf-like of the completed unit. If the protective layer 42 can be made not only of solder-stop lacquer, but also of other protective lacquers and can be replaced, if desired, by a metallized layer of nickel, silver, gold or other metals which in this case need be provided only on the circuit strips 2–7.

It will be appreciated that with the construction according to the present invention an electric circuit arrangement is provided, and a method of making it, which avoids the earlier outlined disadvantages of the prior art and can be produced in a much less expensive manner than what is known from the art. Hence, the objects of the present invention has been achieved.

It will be understood that each of the elements described above, or two or more together, may also find a useful application in other types of constructions differing from the type described above.

While the invention has been illustrated and described as embodied in an electric circuit arrangement, it is not intended to be limited to the details shown, since various modifications and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A method of making an electric circuit arrangement, comprising the steps of providing an electrically insulating circuit board having opposite major surfaces and holes extending intermediate said surfaces and electrically conductive circuit strips on both of said major surfaces; mounting on one of said major surfaces a semiconductor unit having exposed electrical terminals; electrically connecting said terminals with respective ones of said strips using bond wires; mounting surround means defining a chamber around said mounted semiconductor unit on said one major surface; depositing a protective covering of polymerizable material into said surround means of sufficient quantity so as to encapsulate said semiconductor unit and said bond wires and form a meniscus above said semiconductor unit; mounting on said one major surface a plurality of discrete electrical components having conductive leads which extend through said respective ones of said holes to said other major surface and to respective circuit strips thereof; and soldering said leads at said other major surface to the respectively associated circuit strips by contacting said leads with a surge-deposition soldering bath.

2. A method of making an electric circuit arrangement, comprising the steps of providing an electrically insulating circuit board having opposite major surfaces and holes extending intermediate said surfaces and electrically conductive circuit strips on one of said major surfaces; applying a coating of an anti-solder lacquer substance which is nonwettable by liquid solder on a portion of said circuit strips on said one major surface; mounting on another portion of said one major surface which has not been applied with said anti-solder lacquer a semiconductor unit having exposed electrical terminals; electrically connecting said terminals with respective ones of said strips using bond wires; mounting surround means defining a chamber around said mounted semiconductor unit on said portion of said one major surface which has been applied with said anti-solder lacquer; depositing a protective covering of polymerizable material into said surround means of sufficient quantity so as to encapsulate said semiconductor unit and said bond wires and form a meniscus above said semiconductor unit; mounting on the other of said major surfaces a plurality of discrete electrical components having conductive leads which extend through said respective ones of said holes to said one major surface and to respective circuit strips thereof; and soldering said leads at said one major surface to the respectively associated circuit strips by contacting said leads with a surge-deposition soldering bath, whereby contact between the solder and said semi-conductor unit is prevented by an air pocket formed by said meniscus as well as by said protective covering of polymerizable material itself.

3. A method as defined in claim 2, wherein said step of mounting said semiconductor unit includes bonding said semiconductor unit with an electrically conductive substance.

4. A method as defined in claim 2, wherein said step of mounting said semiconductor unit includes bonding said semiconductor unit with a nonconductive electrical substance.

5. A method as defined in claim 2, wherein said step of depositing a protective covering includes depositing a layer of synthetic resin material on said portion of said circuit strips.

6. A method as defined in claim 2; and further comprising the step of providing heat sinks which remove heat from said semiconductor unit.

7. A method as defined in claim 2, wherein said step of mounting said surround means includes mounting an annular member.

8. A method as defined in claim 2, wherein said step of applying said anti-solder lacquer is applied before said step of mounting said semiconductor unit.

9. A method as defined in claim 2, wherein said step of mounting said surround means includes mounting an annular cap with an opening so that said protective covering may be deposited through said opening and form a cylindrically-shaped mass.

10. A method for making an electrical circuit as defined in claim 2, wherein said step of depositing a protective covering includes forming said meniscus of concave configuration.

* * * * *